(12) United States Patent
Yu

(10) Patent No.: US 12,246,617 B2
(45) Date of Patent: Mar. 11, 2025

(54) VEHICLE TRACTION BATTERY CIRCUIT AND CONTROL SYSTEM

(71) Applicant: JAGUAR LAND ROVER LIMITED, Coventry (GB)

(72) Inventor: Tung Fai Yu, Rugby (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 0 days.

(21) Appl. No.: 17/616,651

(22) PCT Filed: Jun. 3, 2020

(86) PCT No.: PCT/EP2020/065358
§ 371 (c)(1),
(2) Date: Dec. 4, 2021

(87) PCT Pub. No.: WO2020/245203
PCT Pub. Date: Dec. 10, 2020

(65) Prior Publication Data
US 2022/0227256 A1    Jul. 21, 2022

(30) Foreign Application Priority Data

Jun. 4, 2019   (GB) ..................... 1907893

(51) Int. Cl.
*B60L 58/19*    (2019.01)
*B60L 58/20*    (2019.01)
*H02J 7/00*    (2006.01)

(52) U.S. Cl.
CPC ............. *B60L 58/19* (2019.02); *B60L 58/20* (2019.02); *H02J 7/0019* (2013.01); *H02J 7/0024* (2013.01)

(58) Field of Classification Search
CPC ........ B60L 58/19; B60L 58/20; H02J 7/0014; H02J 7/0024
(Continued)

(56) References Cited

U.S. PATENT DOCUMENTS 9,030,167 B2 *   5/2015   Yamaguchi ......... H01M 10/441
                                                            320/117
10,259,336 B2    4/2019   McQuillen et al.
(Continued)

FOREIGN PATENT DOCUMENTS

CN        109417299 A        3/2019
CN        109649216 A        4/2019
(Continued)

OTHER PUBLICATIONS

Combined Search and Examination Report corresponding to Great Britain Application No. GB 1907893, dated Dec. 4, 2019, 6 pages.
(Continued)

*Primary Examiner* — Daniel Kessie
*Assistant Examiner* — Dru M Parries
(74) *Attorney, Agent, or Firm* — Reising Ethington P.C.

(57) ABSTRACT

Aspects of the present invention relate to a circuit for a traction battery of a vehicle, the circuit comprising: switching means configured to electrically interconnect in series a first cell set comprising one or more battery cells and a second cell set comprising one or more battery cells, and configured to electrically interconnect in parallel the first cell set and the second cell set; and at least one component configured to control electrical energy transfer between the first cell set and the second cell set associated with the first cell set and the second cell set having unequal voltages.

11 Claims, 3 Drawing Sheets

(58) Field of Classification Search
USPC .......................................................... 307/10.1
See application file for complete search history.

(56) References Cited

U.S. PATENT DOCUMENTS

| | | | | |
|---|---|---|---|---|
| 10,741,885 | B2* | 8/2020 | Zacher | ................... B60L 53/36 |
| 10,800,286 | B2 | 10/2020 | Doersam et al. | |
| 10,850,620 | B2 | 12/2020 | Kahnt et al. | |
| 2017/0366005 | A1* | 12/2017 | Isshiki | ................... H02J 7/005 |

FOREIGN PATENT DOCUMENTS

| | | | |
|---|---|---|---|
| DE | 102016122453 | A1 | 5/2018 |
| DE | 102017123184 | A1 | 4/2019 |
| WO | 2014156390 | A1 | 10/2014 |

OTHER PUBLICATIONS

International Search Report corresponding to International Application No. PCT/EP2020/065358, dated Aug. 18, 2020, 4 pages.
Written Opinion corresponding to International Application No. PCT/EP2020/065358, dated Aug. 18, 2020, 7 pages.
Chinese Office Action in English language corresponding to application 202080041836, dated Jul. 20, 2023, 20 pages.
Chinese Office Action in English language corresponding to application 202080041836, dated Mar. 27, 2024, 12 pages.

* cited by examiner

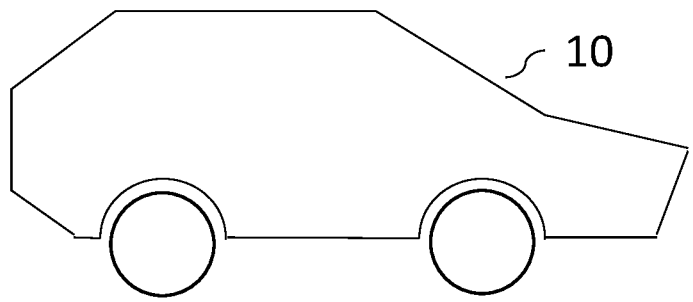
Figure 1
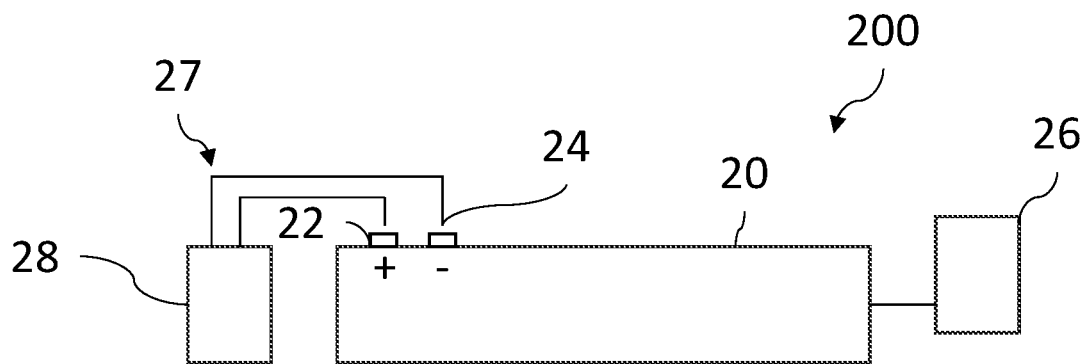
Figure 2
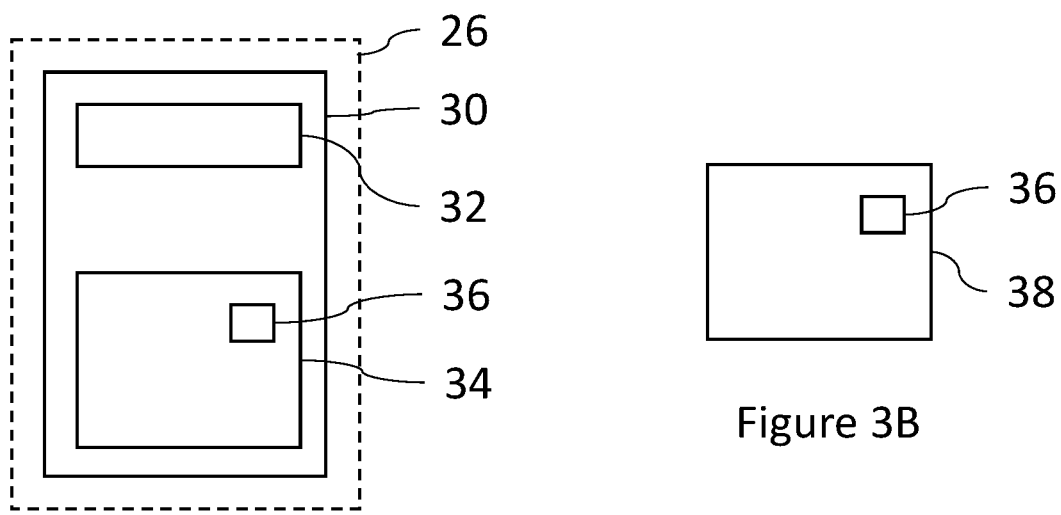
Figure 3A
Figure 3B

| Mode | B | C | D | State |
|---|---|---|---|---|
| M1 | 0 | 0 | 0 | 0V |
| M2 | 0 | 0 | 1 | 400V half-pack |
| M3 | 0 | 1 | 0 | 800V series |
|  | 0 | 1 | 1 | Not used |
| M4 | 1 | 0 | 0 | 400V half-pack |
| M5 | 1 | 0 | 1 | 400V full power |
|  | 1 | 1 | 0 | Not used |

VEHICLE TRACTION BATTERY CIRCUIT AND CONTROL SYSTEM

TECHNICAL FIELD

The present disclosure relates to a circuit for a traction battery, and to a control system. In particular, but not exclusively it relates to a circuit for a traction battery of a vehicle, and to a control system for the vehicle.

BACKGROUND

Electric vehicles and hybrid electric vehicles comprise traction motors, and traction batteries for supplying electrical energy to the traction motors. Some traction batteries can be recharged with electrical energy from outside the vehicle, such as electrical energy from an electrical grid.

A traction battery of known design comprises a plurality of cell packs. Each cell pack comprises a set of one or more battery cells ('cells' herein). Each battery cell should provide a nominal (design) voltage when fully charged. However, the actual voltage at full charge may differ from the nominal voltage within manufacturing tolerances, or due to aging, or due to imperfect balancing during recharging.

SUMMARY OF THE INVENTION

It is an aim of the present invention to address one or more disadvantages associated with the prior art.

Aspects and embodiments of the invention provide a circuit, a control system, a system, a vehicle, a method, and computer software, as claimed in the appended claims.

According to a further aspect of the invention there is provided a circuit for a traction battery of a vehicle, the circuit comprising: switching means configured to electrically interconnect in series a first cell set comprising one or more battery cells and a second cell set comprising one or more battery cells, and configured to electrically interconnect in parallel the first cell set and the second cell set; and the circuit comprising at least one component configured to control electrical energy transfer between the first cell set and the second cell set associated with the first cell set and the second cell set having unequal voltages.

An advantage is improved durability of a traction battery with a fast charging option. This is because the component can reduce voltage imbalance-induced current surge when switching between parallel (normal charge) and series (fast charge) modes.

The switching means may be configured to electrically interconnect in parallel the first cell set and the second cell set in a first path that comprises the at least one component, and may be configured to electrically interconnect in parallel the first cell set and the second cell set in a second path that does not comprise the at least one component.

An advantage is improved efficiency. This is because the component has a resistance and can be taken out of circuit when it is not required.

The at least one component may comprise a resistor.

An advantage is reduced cost and complexity than other components such as DC-DC converters or earthed capacitors.

A nominal terminal voltage of the traction battery may be a first value greater than 300 volts when the first cell set and the second cell set are electrically interconnected in series. The first value may be greater than 500 volts. The nominal terminal voltage of the traction battery may be a second value less than the first value when the first cell set and the second cell set are electrically interconnected in parallel.

An advantage of series interconnection is reduced charging time because higher voltages enable higher charging power.

The switching means may be configured to electrically disconnect the first cell set without electrically disconnecting the second cell set and/or the switching means may be configured to electrically disconnect the second cell set without electrically disconnecting the first cell set. The circuit may comprise a first fuse configured to electrically disconnect the first cell set without electrically disconnecting the second cell set and/or the circuit may comprise a second fuse configured to electrically disconnect the second cell set without electrically disconnecting the first cell set.

An advantage is improved fault tolerance, because the vehicle can continue to operate on a reduced number of cell sets.

The circuit may comprise a first isolator configured to electrically disconnect the first cell set without electrically disconnecting the second cell set and/or the circuit may comprise a second isolator configured to electrically disconnect the second cell set without electrically disconnecting the first cell set.

An advantage is improved fault tolerance, because individual cell sets can be isolated manually if automatic means are unavailable.

The circuit may comprise a series-breaker fuse configured to break the series electrical interconnection of the first cell set and the second cell set. The series-breaker fuse may comprise a pyrotechnic fuse actuator.

An advantage is improved fault tolerance, because the vehicle is less likely to become stuck in a series mode incompatible with driving.

The series-breaker fuse may be configured to break the series electrical interconnection of the first cell set and the second cell set without preventing parallel electrical interconnection of the first cell set and the second cell set.

An advantage is improved fault tolerance, because the vehicle can continue to operate on a reduced number of cell sets.

According to a further aspect of the invention there is provided a traction battery comprising the circuit, and the first cell set and the second cell set.

According to a further aspect of the invention there is provided a vehicle comprising the traction battery.

According to a further aspect of the invention there is provided a control system for controlling a circuit for a traction battery of a vehicle, the control system comprising one or more controllers, wherein the control system is configured to: control switching means of the circuit to electrically interconnect in series a first cell set comprising one or more battery cells and a second cell set comprising one or more battery cells; and control the switching means of the circuit to electrically interconnect in parallel the first cell set and the second cell set in a first path that comprises at least one component, wherein the at least one component is configured to control electrical energy transfer between the first cell set and the second cell set associated with the first cell set and the second cell set having unequal voltages.

The one or more controllers may collectively comprise: at least one electronic processor having an electrical input for receiving information from one or more sensors and/or one or more external controllers; and at least one electronic memory device electrically coupled to the at least one electronic processor and having instructions stored therein; and wherein the at least one electronic processor is configured to access the at least one memory device and execute the instructions thereon so as to cause the control system to control the switching means in dependence on the information.

The control system may be configured to: receive information capable of indicating a detected or expected voltage imbalance between the first cell set and the second cell set; determine whether to electrically interconnect in parallel the first cell set and the second cell set in the first path comprising the at least one component, or in a second path that does not comprise the at least one component, in dependence on the received information; and control the switching means of the circuit in dependence on the determination.

The control system may be configured to: receive information indicative of a required vehicle charging voltage; determine whether to electrically interconnect the first cell set and the second cell set in series or in parallel, in dependence on the received information; and control the switching means in dependence on the determination.

The control system may be configured to: receive information indicative of a requirement to electrically disconnect one of the first cell set or the second cell set from a terminal while the other of the first cell set or the second cell set remains electrically connected to the terminal; and control the switching means to electrically disconnect the first cell set from the terminal without electrically disconnecting the second cell set from the terminal, in dependence on the requirement being to electrically disconnect the first cell set from the terminal; or control the switching means to electrically disconnect the second cell set from the terminal without electrically disconnecting the first cell set from the terminal, in dependence on the requirement being to electrically disconnect the second cell set from the terminal.

According to a further aspect of the invention there is provided a system comprising the control system, the circuit, the first cell set and the second cell set.

According to a further aspect of the invention there is provided a vehicle comprising the system.

According to a further aspect of the invention there is provided a method of controlling a circuit for a traction battery of a vehicle, the method comprising: controlling switching means of the circuit to electrically interconnect in series a first cell set comprising one or more battery cells and a second cell set comprising one or more battery cells; and controlling the switching means of the circuit to electrically interconnect in parallel the first cell set and the second cell set in a first path that comprises at least one component, wherein the at least one component is configured to control electrical energy transfer between the first cell set and the second cell set associated with the first cell set and the second cell set having unequal voltages.

According to a further aspect of the invention there is provided computer software that, when executed, is arranged to perform any one or more of the methods described herein.

According to a further aspect of the invention there is provided a non-transitory computer readable medium comprising computer readable instructions that, when executed by a processor, cause performance of any one or more of the methods described herein.

According to a further aspect of the invention there is provided a circuit for a traction battery of a vehicle, the circuit comprising: switching means operable to control electrical interconnection of a plurality of cells in a first configuration to provide a first terminal voltage, and operable to control electrical interconnection of the plurality of cells in a second configuration to provide a second terminal voltage different from the first terminal voltage and greater than 300 volts.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which:

FIG. 1 illustrates an example of a vehicle;

FIG. 2 illustrates an example of a traction battery, a traction motor and a control system;

FIG. 3A illustrates an example of a control system comprising a controller;

FIG. 3B illustrates an example of a non-transitory computer readable medium storing instructions;

DETAILED DESCRIPTION

Figures 4, 5:
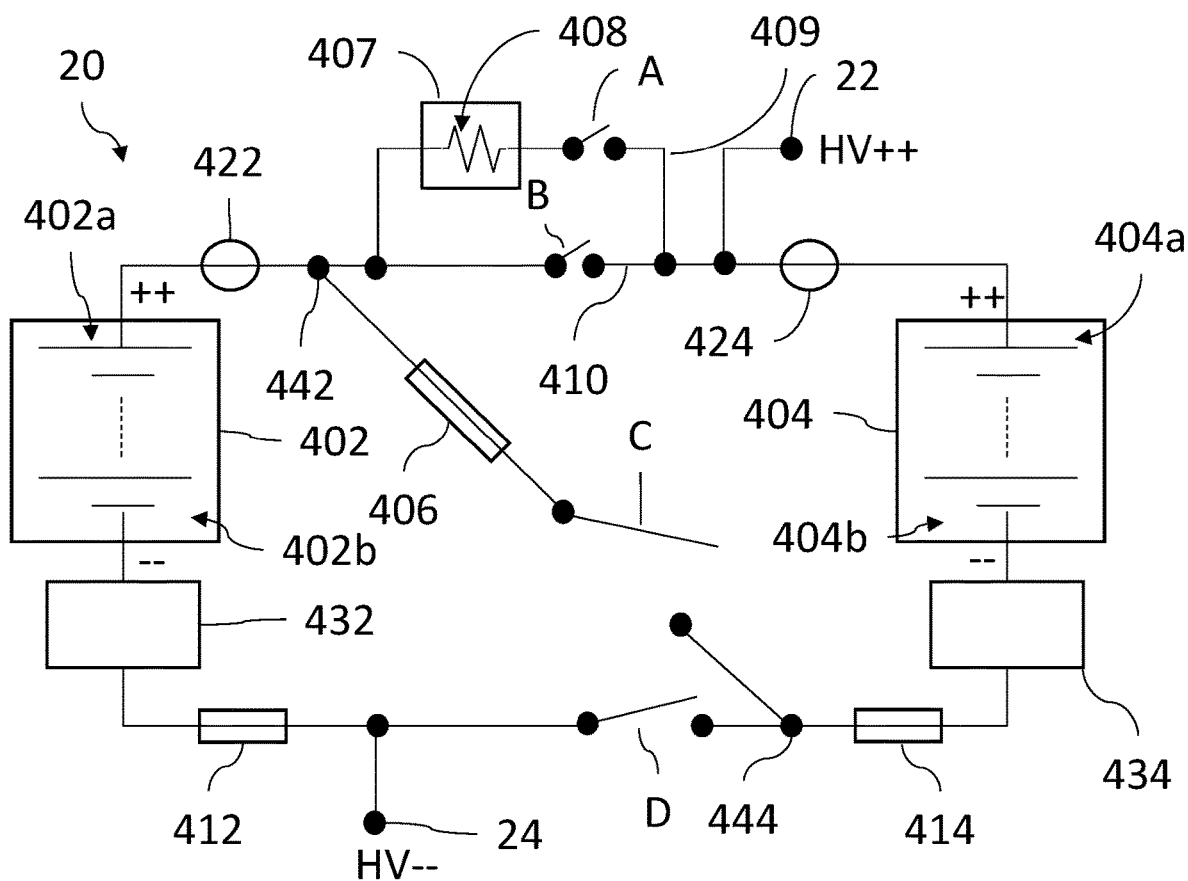
FIG. 4 illustrates an example of a circuit.
FIG. 5 illustrates an example of modes of the switching means of the circuit of FIG. 4.

FIG. 1 illustrates an example of a vehicle 10 in which embodiments of the invention can be implemented. In some, but not necessarily all examples, the vehicle 10 is a passenger vehicle, also referred to as a passenger car or as an automobile. In other examples, embodiments of the invention can be implemented for other applications, such as industrial vehicles.

The vehicle 10 may be an electric vehicle (EV) or a hybrid electric vehicle (HEV). If the vehicle 10 is an HEV, the vehicle 10 may be a plug-in HEV or a mild HEV. If the vehicle 10 is a plug-in HEV, the vehicle 10 may be a series HEV or a parallel HEV.

In a parallel HEV, a traction motor and an internal combustion engine are operable in parallel to simultaneously provide tractive torque. In a series HEV, the internal combustion engine generates electricity and the traction motor exclusively provides tractive torque.

FIG. 2 illustrates a system 200 comprising a traction battery 20 ('battery' herein) and a control system 26 for the EV or HEV 10, which may be supplied together or separately. FIG. 2 also illustrates a traction motor 28 which could optionally be part of the system 200.

The battery 20 may be a high voltage battery, particularly if the vehicle 10 is an EV or a plug-in HEV. High voltage traction batteries provide nominal voltages in the hundreds of volts, as opposed to traction batteries for mild HEVs which provide nominal voltages in the tens of volts. The battery 20 may have a voltage and capacity to support electric only driving for sustained distances requiring continuous battery power.

The battery 20 may have a capacity of several kilowatt-hours, to maximise range. The capacity may be in the tens of kilowatt-hours, or even over a hundred kilowatt-hours.

The battery 20 comprises a positive terminal 22 and a negative terminal 24. The terminals 22, 24 may be configured for connection to a high voltage bus 27. The high voltage bus 27 may be configured to supply energy from the battery 20 to power electronics, such as an inverter (not shown), and onwards to the traction motor 28.

The high voltage bus 27 may also comprise charging circuitry, for connecting a charging port (not shown) and/or a generator to the battery 20.

Although one battery 20 is shown, the vehicle 10 could comprise additional traction batteries.

The illustrated traction motor 28 may be configured to output tractive torque directly or indirectly to one or more wheels of the vehicle 10. The traction motor 28 may also be configured to operate as a regenerative brake generator for converting kinetic energy of the vehicle 10 to electrical energy for the battery 20.

Although one traction motor 28 is shown, the vehicle 10 could comprise additional traction motors, for the same or different wheels of the vehicle 10.

FIG. 3A illustrates how the control system 26 may be implemented. The control system 26 of FIG. 3A illustrates a controller 30. In other examples, the control system 26 may comprise a plurality of controllers on-board and/or off-board the vehicle 10.

The controller 30 of FIG. 3A includes at least one electronic processor 32; and at least one electronic memory device 34 electrically coupled to the electronic processor and having instructions 36 (e.g. a computer program) stored therein, the at least one electronic memory device 34 and the instructions 36 configured to, with the at least one electronic processor 32, cause any one or more of the methods described herein to be performed.

According to an example implementation, the controller 30 of FIG. 3A is a battery management system (BMS). The BMS may be internal to or external from a protective housing of the battery 20.

FIG. 3B illustrates a non-transitory computer-readable storage medium 38 comprising the instructions 36 (computer software).

FIG. 4 illustrates a battery 20 comprising an example of the circuit 400 described herein. In some examples, the battery 20 of FIG. 4 may be the battery 20 of FIG. 2, for a vehicle 10 such as the vehicle 10 of FIG. 1.

The battery 20 comprises a first cell pack 402 and a second cell pack 404.

The first cell pack 402 corresponds to a first cell set of one or more cells 402a, 402b . . . . The first cell set may comprise a plurality of cells. A series string of two cells 402a, 402b is shown in FIG. 4, but more cells could be provided in the string, in other examples.

The first cell pack 402 may be a supplied module ('pack') housing the first set of cells 402a, 402b. Alternatively, the first set of cells 402a, 402b may not be supplied as a pack, and just as a cell set 402a, 402b. Although the term cell pack is used in the description below, just cell sets could be used instead, depending on implementation.

The individual cells of the first cell pack 402 may have equal or unequal nominal voltages. The cells of the first cell pack 402 may be interconnected in a single series string as illustrated, in parallel strings, or in a combination of parallel and series strings.

The nominal voltage of the first cell pack 402 may be in the hundreds of volts. In some examples, the nominal voltages of each of the cell packs is from the range 300-600 volts. In a specific example, the nominal voltage may be 400 volts to one significant figure. The nominal voltage is defined as the voltage between a positive terminal of the last cell of the string and a negative terminal of the first cell of the string.

Each cell pack may comprise voltage sensors (not shown) for measuring the voltage of each cell, or between the first and last cells of a string. The voltage sensor may be configured to provide voltage indications to the control system 26 or another control system for controlling pack balancing during charging or for other methods.

The second cell pack 404 corresponds to a second cell set of one or more cells 404a, 404b.

By design, the nominal voltage of the second cell pack 404 may be the same as the nominal voltage of the first cell pack 402.

The second cell pack 404 may have the same components as the first cell pack 402, in the same arrangement. Alternatively, the second cell pack 404 could have a different number of cells and/or the cells could be interconnected differently.

The circuit 400 is configured to connect a positive terminal ++ of the first cell pack 402 to the positive terminal 22 of the battery 20. The circuit 400 is configured to connect a positive terminal ++ of the second cell pack 404 to the positive terminal 22 of the battery 20. The circuit 400 is configured to connect a negative terminal -- of the first cell pack 402 to the negative terminal of the battery 20. The circuit 400 is configured to connect a negative terminal -- of the second cell pack 404 to the negative terminal of the battery 20.

The circuit 400 of FIG. 4 is further configured in a particular way that solves problems associated with charging. Range anxiety and lengthy charge times challenge the adoption of zero-emissions electric vehicles. Without a fast charge option, the cell packs can take a long time to charge when plugged in to a charging station. Therefore, a fast charge option is available wherein if a compatible fast charger is connected, the cell packs can be charged faster than usual. The fast charge option may utilize a higher voltage than usual, since raising the current instead is less efficient and may exceed current limits for charging cables. Backwards compatibility with slower, lower voltage charging options should be maintained, to improve access to charging stations.

To enable fast charging and backwards compatibility, the circuit 400 is configured to facilitate charging at different voltages by comprising switching means.

The switching means of FIG. 4 comprises a first switch A, a second switch B, a third switch C and a fourth switch D. The function of switch A will be described later, and until then the circuit 400 will be described as if switch A is open.

The switches may be relays, for automatic operation. The switches may be single pole single throw switches or could be merged while providing equivalent functionality.

Switch B is located to control interconnection of the positive terminal ++ of one of the cell packs with the positive terminal 22 of the battery 20. In FIG. 4, but not necessarily in all examples, switch B is between the first cell pack 402 and the positive terminal 22 of the battery 20.

Switch D controls interconnection of the negative terminal of other of the cell packs with the negative terminal of the battery 20. In FIG. 4, switch D is between the second cell pack 404 and the negative terminal. The first cell pack 402 may be connected to the negative terminal regardless of the state of switch D.

Switch C resides in an additional electrical path that connects the positive terminal ++ of one of the cell packs to the negative terminal -- of the other of the cell packs. When switch C is closed, the positive terminal ++ of one of the cell packs is connected to the negative terminal -- of the other of the cell packs, forming a series string of cell packs. In FIG. 4, switch C controls whether the positive terminal ++ of the first cell pack 402 is connected to the negative terminal -- of the second cell pack 404.

In another implementation, switch C may interconnect intermediate cells of the cell packs, rather than connecting the last cell of the first cell pack 402 to the first cell of the second cell pack 404. This enables greater control of the voltage at the terminals of the battery 20.

In FIG. 4, but not necessarily in all examples, the electrical path comprising switch C branches from the electrical path comprising switch B, at node 442. The node 442 is between the positive terminal ++ of the first cell pack 402 and switch B. At the negative side, the electrical path comprising switch C branches from the electrical path comprising switch D, at node 444. The node 444 is between switch D and the negative terminal -- of the second cell pack 404.

Therefore, the switches B-D of FIG. 4 are arranged so that closing switches C and D short-circuits the first cell pack 402, and closing switches B and C short-circuits the second cell pack 404.

FIG. 5 is a table illustrating operation modes M1-M5 enabled by controlling the switches B-D of FIG. 4 in different open (0) and closed (1) states.

The switching means is configured to enable a higher voltage charging mode M3 by electrically interconnecting the first cell pack 402 and the second cell pack 404 in series. In FIG. 4, this would comprise closing switch C. Switches B and D may be opened to prevent a short circuit. Switches B and D may be opened before switch C is closed, to prevent a short circuit.

In this high voltage charging mode M3, the nominal voltage at the terminals of the battery 20 becomes greater than the nominal voltages of the cell packs. For example, if the nominal cell pack voltages are 400 volts to one significant figure, the nominal voltage at the terminals may be greater than or equal to 500 volts to one significant figure.

In FIG. 4, the cell packs are connected end-to-end in the high voltage charging mode M3, so the nominal voltage at the terminals of the battery 20 in mode M3 is the sum of the nominal voltages of the cell packs 402, 404. If the nominal voltages of each of the cell packs is from the range 300-600 volts, then the nominal voltage at the terminals will become from the range 600-1200 volts. The exact voltage depends on implementation.

Based on an example mentioned earlier, the nominal cell pack voltages are 400 volts to one significant figure. Further, the nominal voltage at the terminals of the battery 20 may be 800 volts to one significant figure in mode M3. The battery 20 may therefore support 800-volt charging.

The switching means is also configured to enable one or more lower voltage charging modes M2, M4, M5. In FIG. 4, this would involve opening switch C and closing only switch B (mode M4) or closing only switch D (mode M2) or closing both of switches B and D (mode M5). Mode M5 is a parallel mode in which the first cell pack 402 and the second cell pack 404 are interconnected in parallel. Switch C may be opened first to prevent a short circuit.

In this lower voltage charging mode (mode M2 or M4 or M5 in FIG. 5), the nominal voltage at the terminals would be identical to the nominal voltages of the individual cell packs, assuming that the cell packs have identical nominal voltages to each other.

Therefore, if the nominal voltages of each of the cell packs is from the range 300-600 volts, then the nominal voltage at the terminals will be from the same range in mode M2, M4 and M5. Based on an example mentioned above, the cell pack voltages are 400 volts to one significant figure. The nominal voltage at the terminals of the battery 20 may be 400 volts to one significant figure. The battery 20 may therefore support 400-volt charging.

In mode M5, the capacity of the battery 20 is double that of mode M2 or M4, because in mode M5 two cell packs are interconnected in parallel to the same terminals. The greater capacity enables full power operation.

Modes M2 and M4 are 'half-pack' modes in which just one of the two cell packs is operational. In mode M2, the switching means electrically disconnects the first cell pack 402 without electrically disconnecting the second cell set. The first cell pack 402 is open-circuit and the second cell pack 404 is closed-circuit. In FIG. 4, only the second cell pack 404 is operational in mode M2. In mode M4, the switching means electrically disconnects the second cell pack 404 without electrically disconnecting the first cell set. The first cell pack 402 is closed-circuit and the second cell pack 404 is open-circuit. In FIG. 4, only the first cell pack 402 is operational in mode M4.

A final mode M1 shown in FIG. 5 corresponds to switches B-D being open, so the voltage at the terminals of the battery 20 is 0V. This may be useful for vehicle maintenance or deep sleep, or may be unused.

Although FIG. 4 shows two cell packs, the battery 20 may comprise more cell packs in other implementations, and the circuit 400 may be extended to accommodate the additional cell packs in a straightforward manner in light of this description.

A difficulty can arise when the first cell pack 402 and the second cell pack 404 do not have identical voltages, even if they are rated to the same nominal voltage. The actual voltages may differ within manufacturing tolerances, or due to aging, or due to imperfect balancing during charging.

If the actual voltages of the cell packs differ when entering mode M5 or when starting to draw a load while in mode M5, then the higher voltage cell pack will drive a short circuit current through the lower voltage cell pack until the voltages are self-equalised. As cell packs have a very low internal resistance, the short circuit current could be thousands of amps, which could cause undesirable resistive heating.

To mitigate this problem, the circuit 400 comprises at least one component 407 configured to control electrical energy transfer between the first cell pack 402 and the second cell pack 404, associated with the first cell set and the second cell set having unequal voltages. In FIG. 4, the component 407 reduces the current magnitude of the voltage imbalance-induced equalizing short circuit current.

In FIG. 4, the component 407 comprises a resistor 408. The resistor 408 of FIG. 4 is an ohmic resistor. The resistance of the resistor 408 may be significantly higher than the internal resistance of the cell packs. In an example, the average or nominal resistance of the resistor 408 may be from the range approximately 1 ohm to approximately 100 ohms. The resistor 408 may be a fixed resistor or a variable resistor.

If the resistor 408 is a variable resistor, the resistor 408 may be configured for its resistance to increase as current rises. For example, the resistor 408 could be a positive temperature coefficient (PTC) thermistor resistor, wherein its resistance increases in proportion to ohmic heating. A variable resistor is useful for regulating the rate of voltage equalization.

Although one resistor 408 is shown, multiple resistors could be provided in series, and/or multiple resistors could be provided in selectable parallel branches for different voltage imbalances. The component 407 of FIG. 4 consists of resistor(s) and no more.

In other examples, the component 407 could be different from a resistor. The component 407 could comprise an earthed capacitor, e.g. earthed to the vehicle chassis. If the battery is electrically floating, earthing can be inconvenient. In a further example, the component 407 may comprise a DC-DC converter. DC-DC converters are more efficient than resistors, but are complex, bulky and expensive compared to resistors, for high power applications.

In FIG. 4, the resistor 408 and switch A is on the positive side of the circuit 400. Alternatively, the resistor 408 and switch A could be on the negative side of the circuit 400, parallel to switch D, to achieve the same result. The resistor 408 is not in the path from node 442 to node 444, because said path is only active in mode M3 in which equalizing short circuit current is not a problem.

Since the resistor 408 is a parasitic, it would be efficient to only use the resistor 408 when it is needed, and to bypass the resistor 408 via switch B when it is not needed.

Therefore, in FIG. 4, the circuit 400 comprises a first path 409 that comprises the resistor 408, and a second path 410 that does not comprise the resistor 408. The first path 409 and the second path 410 are parallel to each other. In FIG. 4, the paths 409, 410 split and rejoin each other between the node 442 and the positive terminal 22 of the battery 20.

The second path 410 comprises switch B. The first path 409 comprises switch A.

If the resistor 408 is instead on the negative side of the circuit 400, the paths would split and rejoin between node 444 and the negative terminal 24 of the battery 20. The second path 410 would comprise switch D instead of switch B.

When switch A is closed, current flows through the first path 409. When switch B is closed, current flows through the second path 410. The switches A and B may optionally be controlled so that only one of them is closed at any given time. Although switches A and B are illustrated as two single pole single throw switches, they could be implemented as a single pole dual throw switch or as another known type of switch for selecting which of the first path 409 and the second path 410 is active.

When entering mode M5, switch A could be closed and switch B could be opened or kept open. Switch D is closed and switch C is open. Switch C could be opened first, then switch D could be closed, then switch A could be closed.

When the resistor 408 is no longer required, e.g. the cell pack voltages are equalized, switch A can be opened and switch B can be closed, to avoid parasitic ohmic losses. Switch B may be closed before switch A is opened, for example if the circuit 400 is under load and a brief open circuit is to be avoided.

Although switch A is illustrated as a separate hardware component from the resistor 408, the switch A and resistor 408 could be implemented using a single solid-state device.

Based on the foregoing, the above-described circuit 400 is able to solve the above-described problems using a very small number of generic components.

The circuit 400 shown in FIG. 4 comprises some additional optional components that are advantageous for improving fault tolerance. These additional components will now be described.

The circuit 400 comprises one or more fuses configured to electrically disconnect one or more cell packs from a terminal of the battery 20. A difference between fuses and switches is that the switches can be reversibly automatically actuated, whereas fuses need to be manually reset or replaced after they actuate.

The fuses comprise a first fuse 412 configured to electrically disconnect the first cell pack 402 without electrically disconnecting the second cell pack 404. The first cell pack 402 becomes open-circuit. The fuses comprise a second fuse 414 configured to electrically disconnect the second cell pack 404 without electrically disconnecting the first cell set. The second cell pack 404 becomes open-circuit. The fuses additionally comprise a third, series-breaker fuse 406 configured to break the series electrical interconnection of the first cell pack 402 and the second cell pack 404, e.g. mode M5.

The first fuse 412 and the second fuse 414 may be rated to open the circuit 400 if a cell pack is short circuited. A cell pack may be short circuited when one of the 'not used' states of the table of FIG. 5 occur, e.g. if switches [B C D] are [0 1 1], [1 1 0] or [1 1 1]. The first fuse 412 and the second fuse 414 therefore protect the cell packs from short circuits. Short circuits may occur if a switch becomes stuck, for example.

The fuses may be rated for sufficiently high currents that they will not open the circuit 400 for normal in-use loads, and will not open the circuit 400 when the resistor 408 is in-circuit for controlling cell pack voltage equalization.

In FIG. 4, the first fuse 412 is between the negative terminal 24 of the battery 20 and the negative terminal −− of the first cell pack 402. Alternatively, the first fuse 412 may be between the positive terminal ++ of the first cell pack 402 and the positive terminal 22 of the battery 20, or more specifically between the positive terminal ++ of the first cell pack 402 and the node 442.

In FIG. 4, the second fuse 414 is between the negative terminal 24 of the battery 20 and the negative terminal −− of the second cell pack 404. More specifically, the second fuse 414 may be between the node 444 and the negative terminal −− of the second cell pack 404, as shown in FIG. 4. Alternatively, the second fuse 414 may be between the positive terminal ++ of the second cell pack 404 and the positive terminal 22 of the battery 20.

The series-breaker fuse 406 is between the nodes 442 and 444, to one side of switch C. This enables the series electrical interconnection of mode M3 to be broken without preventing parallel electrical interconnection of mode M3. This is useful if switch C is stuck closed and a mode change to mode M2, M4 or M5 is required.

In an alternative implementation, just one fuse may be provided if a location exists where all cell packs can be disconnected by one fuse. However, an advantage of having multiple fuses such as in FIG. 4 is that the battery 20 can continue to operate with a reduced number of cell packs. For example, the battery 20 could operate in modes M2 or M4 if the first or second fuse 412, 414 blows. In another example, the battery 20 could operate in a mode other than M3 if the series-breaker fuse 406 blows. Therefore, fault tolerance is improved.

One or more of the fuses may be non-resettable. One or more of the fuses may be passive and self-actuating. The first fuse 412 and the second fuse 414 may be passive and self-actuating. A passive self-actuating fuse may be actuated by melting of a load-bearing internal conductor due to excessive current flow.

The series-breaker fuse 406 may have a different construction from the first fuse 412 and the second fuse 414. The series-breaker fuse 406 may be actuated by an external controller. The series-breaker fuse 406 may be actuated by a pyrotechnic fuse actuator or other externally controllable actuator. External control is useful for faults in which excess currents do not occur. The fuse can be designed with lower internal resistance than the first fuse 412 and the second fuse 414, to reduce parasitic losses. An externally controlled fuse is well-suited to the higher voltage associated with the series mode M3.

The series-breaker fuse 406 can be used in a fault situation when switch C is stuck closed. If the traction motor 28 of the vehicle 10 is only rated for lower voltage (e.g. 400V) operation, it may be necessary to open switch C and transition out of high voltage mode M3 when charging is complete and the vehicle 10 is to be driven. Otherwise, the battery 20 would be unable to supply the required lower voltage for the traction motor 28, and the vehicle 10 would be undriveable.

The circuit 400 also comprises one or more isolators configured to electrically disconnect one or more cell packs from a terminal of the battery 20

A difference between an isolator and a fuse is that fuse actuation may be non-reversible whereas isolator actuation is reversible. Further, a fuse may actuate automatically, whereas an isolator is manually actuated. The isolators may be for manual service disconnection of cell packs. The isolators may comprise an externally accessible button, lever, staple, rotary switch, or other interface for manual actuation of the isolator. The interface may be on a housing of the battery 20, as opposed to elsewhere on the vehicle 10. A fire service isolator could be provided elsewhere on the vehicle.

The isolators comprise a first isolator 432 configured to electrically disconnect the first cell set 402 without electrically disconnecting the second cell set. The first cell set 402 becomes open-circuit. The isolators comprise a second isolator 434 configured to electrically disconnect the second cell set 404 without electrically disconnecting the first cell set. The second cell set 404 becomes open-circuit. The isolators may be interconnected to ensure that a single service action will disconnect both the first and second cell set. For example the isolators may be included in a single physical unit where both cell sets are simultaneously disconnected by the operation of the single physical unit.

The isolators 432, 434 are shown on the negative side of the battery 20, but they could be on the positive side instead or even within the cell packs 402, 404.

In an alternative implementation, just one isolator may be provided if a location exists where all cell packs can be disconnected by one isolator.

The circuit 400 may further comprise one or more current sensors. The circuit 400 of FIG. 4 comprises a first current sensor 422 and a second current sensor 424. The current sensors may be configured to monitor equality of current flow in the parallel mode M5.

The first current sensor 422 is between the first cell pack 402 and the positive or negative terminal 24 of the battery 20. The second current sensor 424 is between the second cell pack 404 and the positive or negative terminal 24 of the battery 20.

The current sensors may be configured to provide current indications to the control system 26 for controlling the switching means and/or the series-breaker fuse 406.

Figure 6:
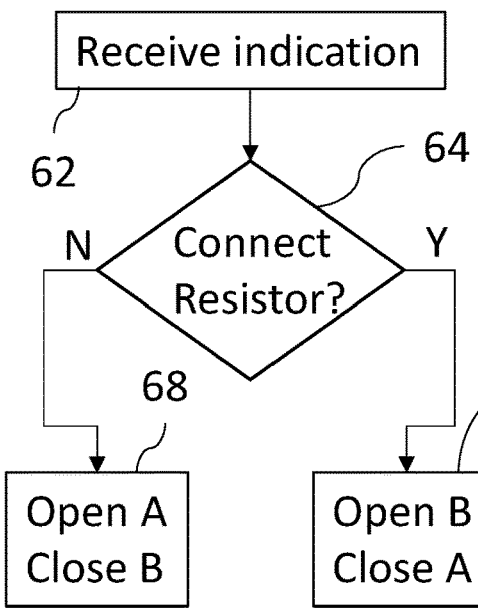
FIG. 6 illustrates an example of a method.
Figure 7:
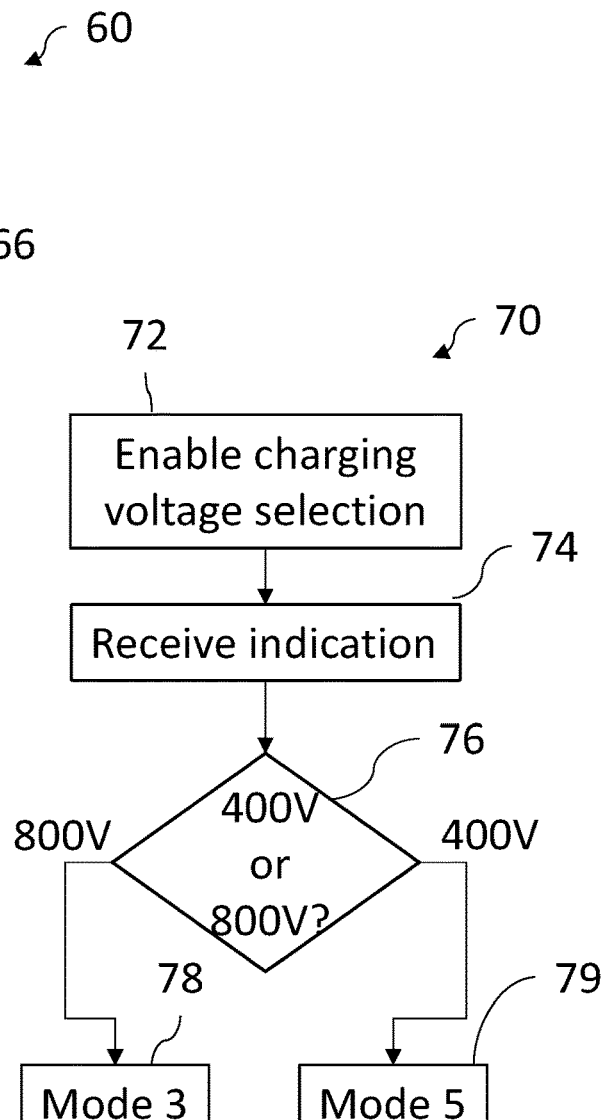
FIG. 7 illustrates an example of another method.
Figure 8:
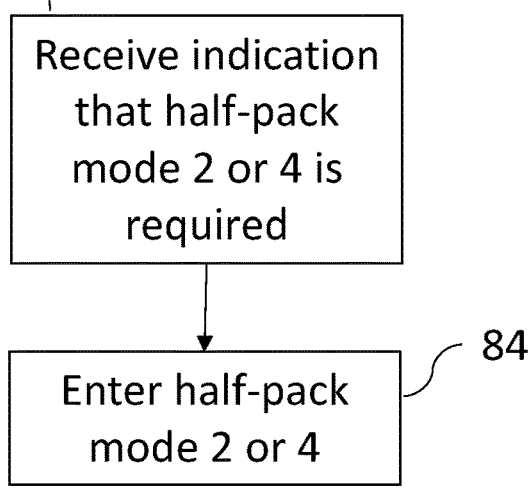
FIG. 8 illustrates an example of a further method.

FIGS. 6 to 8 describe various control methods that may be performed by the control system 26 and applied to the switching means of the circuit 400 as described above.

FIG. 6 is a method 60 for obviating or reducing detected or expected voltage imbalance-induced equalizing short circuit current.

In some examples, the method 60 is not performed while the vehicle is charging. The method 60 is not a cell pack balancing method.

In a specific example, the method 60 may be performed when the cell packs 402 and 404 are interconnected to the battery terminals 22, 24 in parallel, such as in mode M5.

The method 60 may be performed when switching to mode M5, for example on completion of plug-in charging or when the vehicle enters a travelable state.

The method 60 may be performed before a load is to be drawn and/or before charging is to commence while in mode M5, or may be performed when entering mode M5 from a different mode. For example, a load is to be drawn by the traction motor when the vehicle 10 enters a travelable state and is to be driven.

At block 62 of the method 60, the method comprises receiving information capable of indicating a detected or expected voltage imbalance between the first cell pack 402 and the second cell pack 404.

Information indicating an expected voltage imbalance may simply be a command to switch to parallel mode M5 and/or that a load is to be drawn while in/entering mode M5. This is because some imbalance of an unknown value is inherently expected. The command may be issued on completion of charging and/or when an event associated with entering a travelable state occurs, such as entering an ignition power mode associated with entering a travelable state.

Information indicating an expected voltage imbalance may be from voltage sensors of the cell packs.

Information indicating a detected voltage imbalance may be from the current sensors. This is less desirable because current is already flowing.

At decision block 64 of the method 60, the method comprises determining whether to electrically interconnect in parallel the first cell pack 402 and the second cell pack 404 in the first path 409 comprising the resistor 408, or in the second path 410 that does not comprise the resistor 408, in dependence on the received information.

The decision may be always yes (first path 409), in the case of receiving a command. If the decision is based on voltage or current, the decision may be yes if the voltage difference is above a threshold, or if the current is above a threshold. If the threshold is not exceeded, the decision may be no (second path 410).

At blocks 66 and 68 of the method 60, the method comprises controlling the switching means of the circuit 400 in dependence on the determination. At block 66, the first path 409 is used. In FIG. 4, using the first path 409 would involve closing switch A (if open), opening switch B (if closed) and closing switch D (if open). At block 68, the second path 410 is used. In FIG. 4, using the second path 410 would involve opening switch A (if closed), closing switch B (if open) and closing switch D (if open).

Although not shown, the first path 409 may be used for a limited time, before switching to the second path 410. This is because the short circuit equalizing current is only a brief inrush, and then the cell packs are equalized. This reduces parasitic ohmic losses through the resistor 408. A timer may be implemented, with a duration calibrated based on the rate of equalization controlled by the resistor 408. Alternatively, the voltage and/or current may be monitored in a closed loop, and the second path 410 may be switched to once the voltage difference or current falls below a threshold, which may be the same or different as the threshold of block 64.

The control system 26 may be configured to use the first path 409 only while the battery 20 is not being charged or discharged, so that the resistor 408 does not cause voltage imbalance between the first and second cell packs 402, 404.

FIG. 7 is a method 70 for controlling a charging mode of the battery 20. At optional block 72 of the method 70, the method comprises enabling a charging voltage selection. The selection may be by a user. If a charging station supports low voltage and high voltage mode operation (e.g. 400V and 800V), the control system 26 may cause a user interface of the vehicle 10 or of the charging station to provide the user with a user interface element to specify which voltage is desired. Alternatively, the required voltage may be automatically determined based on signals automatically transmitted between the vehicle 10 and the charging station upon connecting the vehicle 10 to the charging station. At block 74 of the method 70, the method comprises receiving information indicative of a required vehicle charging voltage. The information may be from the user selection or from the automatically transmitted signal. At block 76 of the method 70, the method comprises determining whether to electrically interconnect the first cell pack 402 and the second cell pack 404 in series or in parallel, in dependence on the received information. At blocks 78 and 79 of the method 70, the method comprises controlling the switching means in dependence on the determination. If a higher voltage charging mode is required, the cell packs are connected in series mode M3 as per block 78. In FIG. 4, this comprises closing switch C and opening switches B and D. If a lower voltage charging mode is required, the cell packs are connected in parallel mode M5 as per block 79. Mode M5 may be the standard for lower voltage charging, to enable all cell packs to be charged.

The methods 60 and 70 of FIGS. 6 and 7 together enable the functionality of a method of robustly switching between at least modes 3 and 5, the method comprising: controlling switching means of the circuit 400 to electrically interconnect in series a first cell pack 402 comprising one or more battery cells and a second cell pack 404 comprising one or more battery cells (block 78); and controlling the switching means of the circuit 400 to electrically interconnect in parallel the first cell pack 402 and the second cell pack 404 (block 79) in a first path 409 that comprises at least one component 407 (block 66), wherein the at least one component 407 is configured to control electrical energy transfer between the first cell pack 402 and the second cell pack 404 associated with the first cell pack 402 and the second cell pack 404 having unequal voltages. When the timer expires or the voltages are equalized, the electrical interconnection of the first cell pack 402 and the second cell pack may be switched from the first path 409 to the second path 410, to reduce parasitic losses.

FIG. 8 is a method 80 for controlling operation of the battery 20 in a reduced-pack mode. This enables the vehicle 10 to be charged and/or driven with reduced power. At block 82 of the method 80, the method comprises receiving information indicative of a requirement to electrically disconnect one of the first cell pack 402 or the second cell pack 404 from a terminal of the battery 20 while the other of the first cell pack 402 or the second cell pack 404 remains electrically connected to the terminal. The information may be based on readings by the voltage sensors and/or by the current sensors, or from any other sensor that monitors whether a cell pack should be used. The information may comprise the sensor readings, or a flag if another control system has analysed the readings. The information may be indicative of a requirement to electrically disconnect a cell pack when a fault condition associated with the monitored readings is satisfied. An example of a fault condition being satisfied is when a switch is stuck while trying to change modes. At block 84 of the method 80, the method comprises controlling the switching means to electrically disconnect the required cell pack from the terminal without disconnecting at least one other cell pack from the terminal. For example, if the first cell pack 402 should be removed, mode 2 can be entered by closing switch D and opening switches B and C. If the second cell pack 404 should be removed, mode 4 can be entered by closing switch B and opening switches C and D. The method 80 may correspond to a limp home mode. A warning may be output to a human-machine interface, prompting a vehicle service.

In an alternative implementation of the method 80, the battery 20 is operated in a reduced-pack mode for reasons other than faults. For example, the reduced-pack mode may act as a power restrictor or range restrictor function. For example, a vehicle administrator user could use this function to restrict an inexperienced driver or borrower of the vehicle 10.

Although examples in the preceding description refer to series/parallel charging, the series/parallel concepts could be applied in a similar way for a discharging use case. For example, if one or more traction motors are capable of operation at different voltages, the circuit 400 could be controlled as described above to provide the different voltages when needed. Examples in the preceding description refer to changing modes. A mode change may be a direct change, or an indirect change via mode M1.

For purposes of this disclosure, it is to be understood that the controller(s) 30 described herein can each comprise a control unit or computational device having one or more electronic processors. A vehicle 10 and/or a system thereof may comprise a single control unit or electronic controller or alternatively different functions of the controller(s) may be embodied in, or hosted in, different control units or controllers. A set of instructions could be provided which, when executed, cause said controller(s) or control unit(s) to implement the control techniques described herein (including the described method(s)). The set of instructions may be embedded in one or more electronic processors, or alternatively, the set of instructions could be provided as software to be executed by one or more electronic processor(s). For example, a first controller may be implemented in software run on one or more electronic processors, and one or more other controllers may also be implemented in software run on one or more electronic processors, optionally the same one or more processors as the first controller. It will be appreciated, however, that other arrangements are also useful, and therefore, the present disclosure is not intended to be limited to any particular arrangement. In any event, the set of instructions described above may be embedded in a computer-readable storage medium (e.g., a non-transitory computer-readable storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; or electrical or other types of medium for storing such information/instructions.

It will be appreciated that various changes and modifications can be made to the present invention without departing from the scope of the present application.

As used here 'module' refers to a unit or apparatus that excludes certain parts/components that would be added by an end manufacturer or a user. As used here, 'connected' means 'electrically interconnected' either directly or indirectly. Electrical interconnection does not have to be galvanic. Where the control system is concerned, connected means operably coupled to the extent that messages are transmitted and received via the appropriate communication means.

The term 'current' means electrical current. The term 'Voltage' means potential difference. The term 'series' means electrical series. The term 'parallel' means electrical parallel. 'Active' and 'operational' generally mean closed circuit. A 'resistor' is an electrical resistor. The term 'power' means electrical power. The term 'charging' means electrical recharging of the battery.

The blocks illustrated in the FIGS. 6-8 may represent steps in a method and/or sections of code in the computer program 36. The illustration of a particular order to the blocks does not necessarily imply that there is a required or preferred order for the blocks and the order and arrangement of the block may be varied. Furthermore, it may be possible for some steps to be omitted.

Although embodiments of the present invention have been described in the preceding paragraphs with reference to various examples, it should be appreciated that modifications to the examples given can be made without departing from the scope of the invention as claimed. For example, the nominal voltage of the first cell pack 402 may differ from the nominal voltage of the second cell pack 404. The component 408 may therefore have a higher resistance and may be always in-circuit.

Features described in the preceding description may be used in combinations other than the combinations explicitly described. Although functions have been described with reference to certain features, those functions may be performable by other features whether described or not. Although features have been described with reference to certain embodiments, those features may also be present in other embodiments whether described or not. Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A control system for controlling a circuit for a traction battery of a vehicle, the control system comprising one or more controllers, wherein the control system is configured to:
control switching means of the circuit to electrically interconnect in series a first cell set comprising one or more battery cells and a second cell set comprising one or more battery cells; and
control the switching means of the circuit to electrically interconnect in parallel the first cell set and the second cell set in a first path that comprises at least one component, wherein the at least one component is configured to control electrical energy transfer between the first cell set and the second cell set to reduce the magnitude of a voltage imbalance-induced electrical current associated with the first cell set and the second cell set having unequal voltages,
wherein the control system is further configured to:
receive information capable of indicating a detected or expected voltage imbalance between the first cell set and the second cell set;
determine whether to electrically interconnect in parallel the first cell set and the second cell set in the first path comprising the at least one component, or in a second path that does not comprise the at least one component, in dependence on the received information; and
control the switching means of the circuit in dependence on the determination;
wherein the control system comprises a first fuse configured to electrically disconnect the first cell set without electrically disconnecting the second cell set and/or comprising a second fuse configured to electrically disconnect the second cell set without electrically disconnecting the first cell set, and wherein the first fuse and the second fuse are rated for sufficiently high currents such that they will not open when the first cell set and the second cell set are interconnected in the first path,
wherein a series interconnecting path for connecting the first cell set and the second cell set extends from a first node connected to a positive terminal of the first cell set to a second node connected to a negative terminal of the second cell set, wherein the control system has an electrically-switchable path connecting a negative terminal of the traction battery to the second node, wherein the control system is configured so that, as a result of any portion of the electrically-switchable path being opened, electricity is prevented from being communicated between the negative terminal of the traction battery and the second node without passing through the first cell set.

2. The control system of claim 1, wherein a nominal terminal voltage of the traction battery is a first value greater than 300 volts when the first cell set and the second cell set are electrically interconnected in series.

3. The control system of claim 2, wherein the first value is greater than 500 volts.

4. The control system of claim 1, comprising a series-breaker fuse configured to break the series electrical interconnection of the first cell set and the second cell set.

5. The control system of claim 4, wherein the series-breaker fuse is configured to break the series electrical interconnection of the first cell set and the second cell set without preventing parallel electrical interconnection of the first cell set and the second cell set.

6. The control system of claim 1, wherein the control system is configured to:
receive information indicative of a required vehicle charging voltage;

determine whether to electrically interconnect the first cell set and the second cell set in series or in parallel, in dependence on the received information; and control the switching means in dependence on the determination.

7. The control system of claim 1, wherein the control system is configured to:

receive information indicative of a requirement to electrically disconnect one of the first cell set or the second cell set from a terminal while the other of the first cell set or the second cell set remains electrically connected to the terminal; and at least one of:

control the switching means to electrically disconnect the first cell set from the terminal without electrically disconnecting the second cell set from the terminal, in dependence on the requirement being to electrically disconnect the first cell set from the terminal; or control the switching means to electrically disconnect the second cell set from the terminal without electrically disconnecting the first cell set from the terminal, in dependence on the requirement being to electrically disconnect the second cell set from the terminal.

8. A system comprising the control system of claim 1, the first cell set, and the second cell set, the switching means configured to electrically connect the first cell set and second cell set in series or parallel, and the at least one component configured to control electrical energy transfer between the first cell set and the second cell set.

9. A vehicle comprising the system of claim 8.

10. A method of controlling a circuit for a traction battery of a vehicle, the circuit comprising:

switching means configured to electrically interconnect in series a first cell set comprising one or more battery cells and a second cell set comprising one or more battery cells, and configured to electrically interconnect in parallel the first cell set and the second cell set;

at least one component disposed in a first path and configured to control electrical energy transfer between the first cell set and the second cell set to reduce a magnitude of a voltage imbalance-induced electrical current associated with the first cell set and the second cell set having unequal voltages; and at least one of a first fuse and a second fuse, wherein the first fuse is configured to electrically disconnect the first cell set without electrically disconnecting the second cell set, wherein the second fuse is configured to electrically disconnect the second cell set without electrically disconnecting the first cell set, and wherein the first fuse and the second fuse are rated for sufficiently high currents such that they will not open when the first cell set and the second cell set are interconnected in the first path;

wherein the method comprises:

receiving information capable of indicating a detected or expected voltage imbalance between the first cell set and the second cell set;

determining whether to electrically interconnect in parallel the first cell set and the second cell set in the first path comprising the at least one component, or in a second path that does not comprise the at least one component, in dependence on the received information; and controlling the switching means of the circuit in dependence on the determination, wherein a series interconnecting path for connecting the first cell set and the second cell set extends from a first node connected to a positive terminal of the first cell set to a second node connected to a negative terminal of the second cell set, wherein the control system has an electrically-switchable path connecting a negative terminal of the traction battery to the second node, wherein the control system is configured so that, as a result of any portion of the electrically-switchable path being opened, electricity is prevented from being communicated between the negative terminal of the traction battery and the second node without passing through the first cell set.

11. A computer-readable medium having stored thereon computer software that, when executed, is arranged to perform the method according to claim 10.

* * * * *